United States Patent [19]
Chikaraishi et al.

[11] Patent Number: 5,739,616
[45] Date of Patent: Apr. 14, 1998

[54] FIXING STRUCTURE OF COIL YOKE

[75] Inventors: Kazuo Chikaraishi; Kouichi Satoh, both of Gunma, Japan

[73] Assignee: NSK Ltd., Tokyo, Japan

[21] Appl. No.: 721,468

[22] Filed: Sep. 27, 1996

[30] Foreign Application Priority Data

Oct. 3, 1995 [JP] Japan ..................... 7-278276

[51] Int. Cl.⁶ .................. H02K 17/00; G01L 3/02
[52] U.S. Cl. .................. 310/194; 310/166; 73/862.331
[58] Field of Search ................ 310/194; 277/41, 277/37, 153, 121; 73/862.331

[56] References Cited

FOREIGN PATENT DOCUMENTS

3218575A1  11/1983  Germany.
2-89337    7/1990  Japan ............... G01L 3/10

*Primary Examiner*—Steven L. Stephan
*Assistant Examiner*—Timothy A. Williams
*Attorney, Agent, or Firm*—Sughrue, Mion, Zinn, Macpeak & Seas, PLLC

[57] ABSTRACT

A torque sensor including a coil bobbin around which a coil is wound, a coil yoke having a first end face and a second end face, the coil yoke accommodating the coil bobbin, a housing having a medium-diameter portion and a small-diameter portion, the housing being shaped to receive the coil yoke and having a receiving surface at one end of the small-diameter portion, the first end face of the coil yoke abutting against the receiving surface, and a seal member that contacts the second end face of the coil yoke and urges the coil yoke toward the receiving surface to fix a position of the coil yoke in the housing, an outer peripheral surface of the seal member being secured to an inner peripheral surface of the housing at the medium-diameter portion of the housing.

3 Claims, 7 Drawing Sheets

FIXING STRUCTURE OF COIL YOKE

BACKGROUND OF THE INVENTION

The present invention relates to a structure for fixing a coil yoke containing a coil to a housing of such an apparatus as is adapted to detect torque or the like by making use of a change in impedance of the coil. In particular, the present invention relates to a structure for fixing a coil yoke, which is simple in structure, makes it unnecessary to press-fit the coil yoke to a housing, and makes it possible to prevent a change in the magnetic property and obtain a sealing effect.

As disclosed in, for intance, Japanese Utility Model Unexamined Publication No. Hei 2-89337, a torque sensor is conventionally known in which a coil is fixed in a housing, and a cylinder which is electromagnetically coupled with the coil and is displaced in correspondence with the torque produced in a shaft is disposed in the inner side of the coil, so as to detect a torque produced in the shaft by measuring the impedance or the like of the coil.

In the torque sensor disclosed in the aforementioned publication, a cylindrical coil yoke in which the coil is accommodated is fitted into the interior of the housing up to a position where one end face thereof abuts against a predetermined receiving surface in the housing. Further, a resilient member for urging the other end face of the coil yoke in the axial direction is disposed within the housing, thereby preventing the movement or the like of the coil yoke in a direction in which the coil yoke comes off the housing.

However, the conventional torque sensor disclosed in the aforementioned publication does not adopt a structure which is particularly provided with a seal member or the like so as to prevent leakage of oil from a space where the coil yoke is disposed to a space where a circuit board having a circuit for detecting the torque is disposed, or, conversely, to prevent the entrance of dust or the like from the latter space to the former space. For this reason, it is necessary to firmly press-fit the coil yoke into the housing to set the gap virtually to zero. With such an arrangement, however, there is a problem in that the opposite effect of magnetostriction occurs due to the stress to which the coil yoke is subjected by its press-fitting into the housing, and its magnetic property changes.

Incidentally, to overcome such a problem, it is conceivable to adopt a measure in which the coil yoke is loosely inserted into the housing to eliminate the stress, and the oil leakage and the like are avoided by a seal member which is provided separately. However, since such an arrangement results in an increase in the number of component parts or the number of assembling steps, it leads to an increased cost. In addition, since a space for disposing the seal member must be secured, there is a drawback in that the apparatus becomes large in size.

SUMMARY OF THE INVENTION

The present invention has been made in view of the problems of the conventional art, and it is an object of the present invention to provide a fixing structure of a coil yoke, which is simple in structure, makes it unnecessary to press-fit the coil yoke to a housing, and makes it possible to prevent a change in the magnetic property and obtain a sealing effect.

To attain the above object, in accordance with the present invention, there is provided a fixing structure of a coil yoke in an apparatus including a coil bobbin around which a coil is wound, a cylindrical coil yoke for accommodating the coil bobbin in its inner side, and a housing having a fitting portion to which the coil yoke is fitted, characterized in that a receiving surface against which one end face of the coil yoke abuts is formed at a portion of the fitting portion which serves as a bottom when the coil yoke is fitted, and a seal member is provided which is brought into close contact with another end face of the coil yoke fitted in the fitting portion, and urges the other end face toward the receiving surface, an overall outer peripheral surface of the seal member being brought into close contact with an inner peripheral surface of the housing.

DETAILED DESCRIPTION OF THE INVENTION

Referring now to the drawings, preferred embodiments of the present invention will be described.

Figure 1:
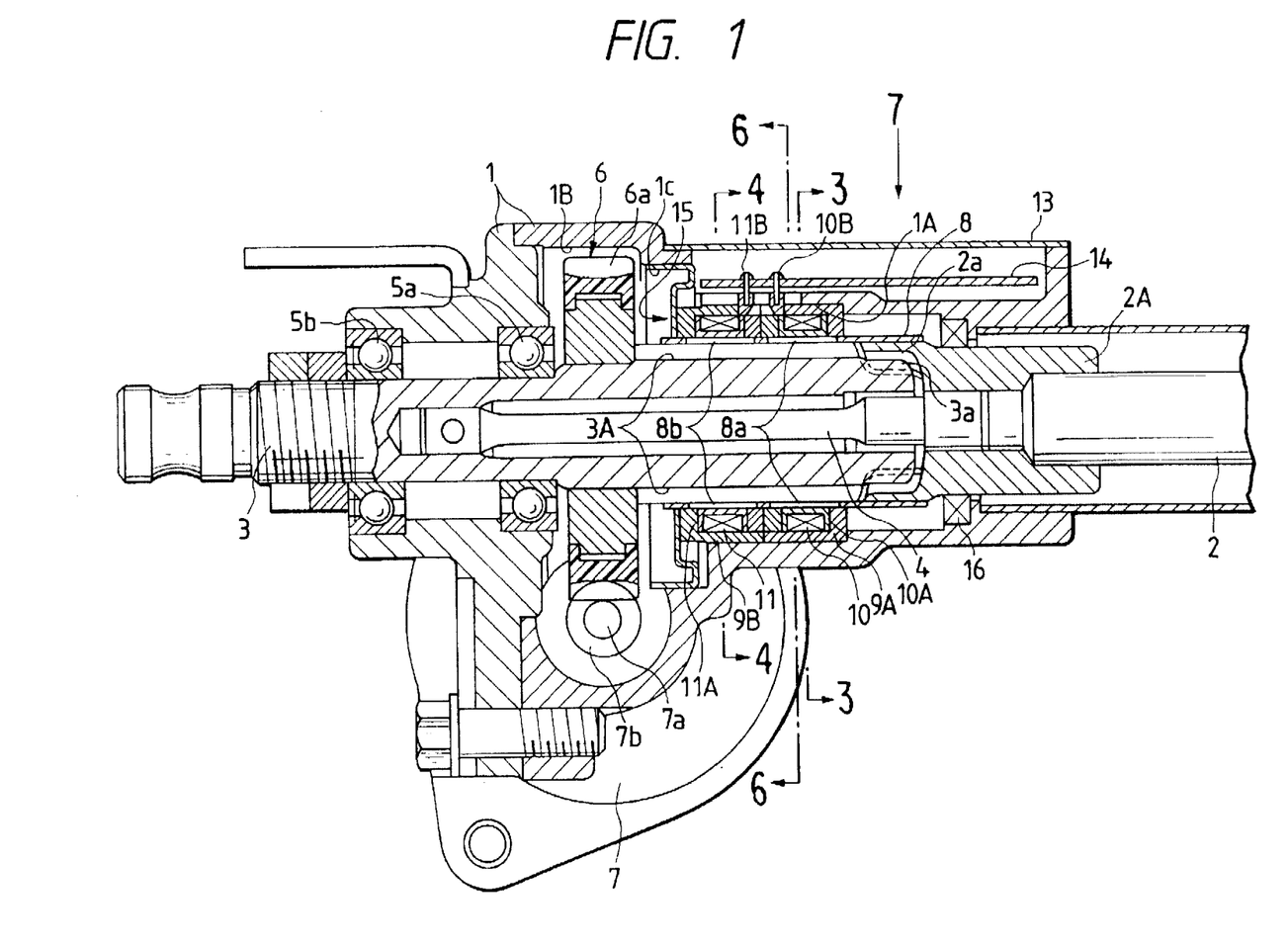
FIG. 1 is a cross-sectional view illustrating an overall configuration of a first embodiment of the present invention.

FIG. 1 is a cross-sectional view illustrating an overall configuration of a first embodiment of the present invention. This embodiment shows an example in which the present invention is applied to a structure for fixing a coil yoke in a torque sensor for an electrically-operated power steering apparatus for a vehicle.

First, the structure will be explained. An input shaft 2 and an output shaft 3, which are coupled to each other through a torsion bar 4, are rotatably supported in a housing 1 by means of bearings 5a and 5b. The input shaft 2, the output shaft 3, and the torsion bar 4 are disposed coaxially. The input shaft 2 and the torsion bar 4 are coupled by means of a sleeve 2A to which respective ends of these members are spline-coupled, and the other end of the torsion bar 4 is spline-coupled to the output shaft 3 at a farther interior position thereof. The input shaft 2 and the output shaft 3 are formed of a magnetic material such as iron.

A steering wheel is attached to a right-hand end (not shown in FIG. 1) of the input shaft 2 in such a manner as to rotate integrally with the input shaft 2. Meanwhile, a pinion shaft, which constitutes a well-known rack-and-pinion type steering apparatus, for example, is connected to a left-hand end (not shown in FIG. 1) of the output shaft 3. Accordingly, a steering force which is produced when an operator steers the steering wheel is transmitted to unillustrated wheels by means of the input shaft 2, the torsion bar 4, the output shaft 3, and the rack-and-pinion type steering apparatus.

The sleeve 2A fixed to the end portion of the input shaft 2 has such a length as to surround an outer peripheral surface of an end portion of the output shaft 3. A plurality of protrusions 2a, which are elongated in the axial direction, are formed on an inner peripheral surface of the sleeve 2A which surrounds the outer peripheral surface of the end portion of the output shaft 3. A plurality of grooves 3a (in a number idendical to that of the protrusions 2a), which are elongated in the axial direction, are formed on an outer peripheral surface of the output shaft 3 opposing the protrusions 2a. The protrusions 2a and the grooves 3a are fitted to each other with leeway in the circumferential direction, which prevents the relative rotation of the input shaft 2 and the output shaft 3 over a range exceeding a predetermined range (e.g., about ±5 degrees).

A worm wheel 6 is exteriorly fitted over the output shaft 3 and rotates coaxially and integrally therewith. A resin-made meshing portion 6a of the worm wheel 6 and a worm 7b formed on an outer peripheral surface of an output shaft 7a of an electric motor 7 mesh with each other. Accordingly, the rotating force of the electric motor 7 is transmitted to the output shaft 3 by means of the output shaft 7a, the worm 7b, and the worm wheel 6. Hence, as the direction of rotation of the electric motor 7 is changed over as required, a steering assisting torque acting in an arbitrary direction is imparted to the output shaft 3.

Further, a thin-walled cylindrical member 8 is secured integrally in the rotating direction to the sleeve 2A which is formed integrally with the input shaft 2, such that the cylindrical member 8 surrounds the outer peripheral surface of the output shaft 3 in close proximity thereto.

Figure 2:
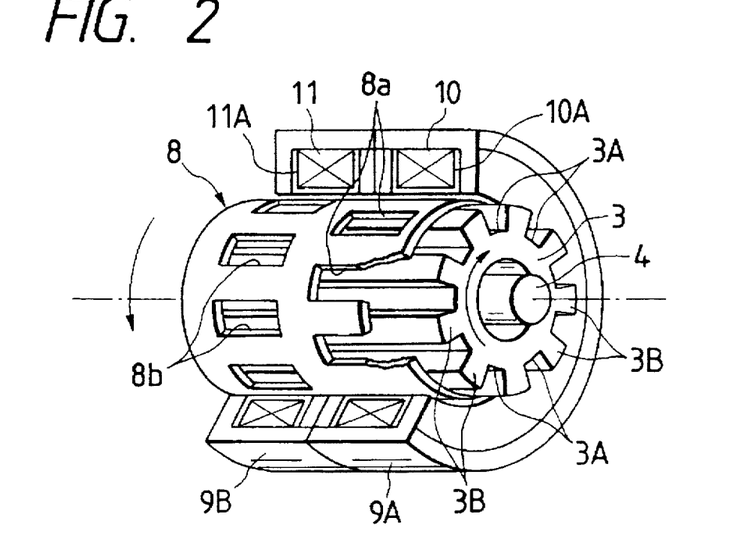
FIG. 2 is a partial perspective view of the first embodiment.

Namely, the cylindrical member 8 is formed of an electrically conductive and nonmagnetic material (e.g., aluminum). As also shown in FIG. 2, which is a perspective view illustrating the cylindrical member 8 and its surroundings, a plurality of (in this embodiment, nine) rectangular windows 8a, which are spaced apart at equal intervals in the circumferential direction, are formed in that portion of the cylindrical member 8 which surrounds the output shaft 3 on the side close to the sleeve 2A. Further, a plurality of (in this embodiment, nine) rectangular (shaped in the same way as the windows 8a) windows 8b, which are spaced apart at equal intervals in the circumferential direction such that their phases are each offset by 180 degrees from the windows 8a, are formed in the aforementioned portion on the side away from the sleeve 2A.

In addition, a plurality of (in a number identical to that of the windows 8a and 8b, hence, in this example, nine) grooves 3A each extending in the axial direction and having a substantially rectangular cross section are formed on an outer peripheral surface of the output shaft 3 at its portion surrounded by the cylindrical member 8.

Figure 3:
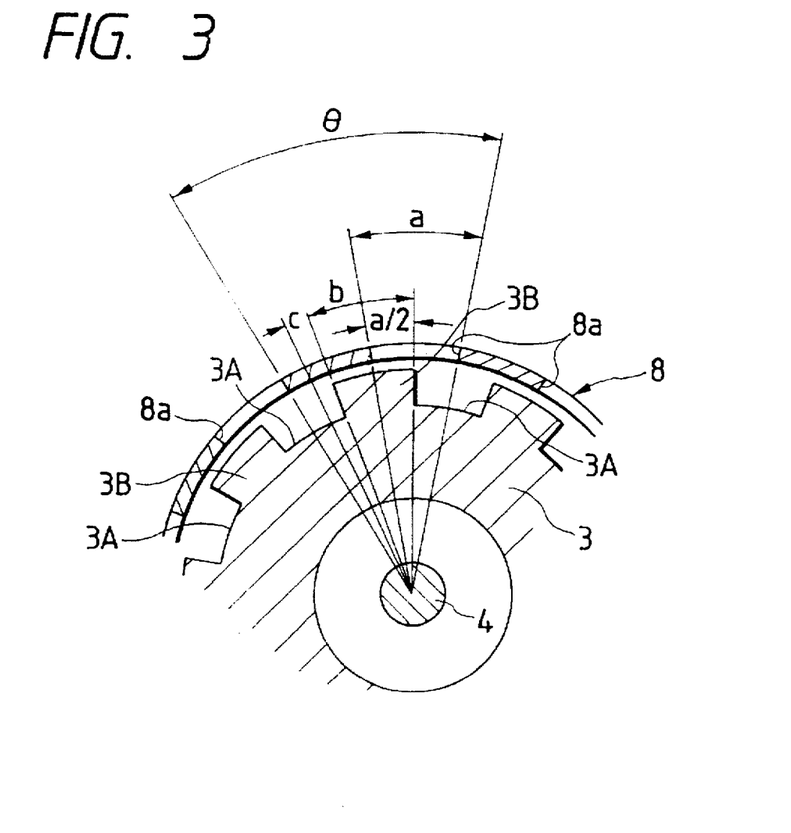
FIG. 3 is a cross-sectional view, taken song line 3—3 of FIG. 1, of a cylindrical member and an output shaft.
Figure 4:
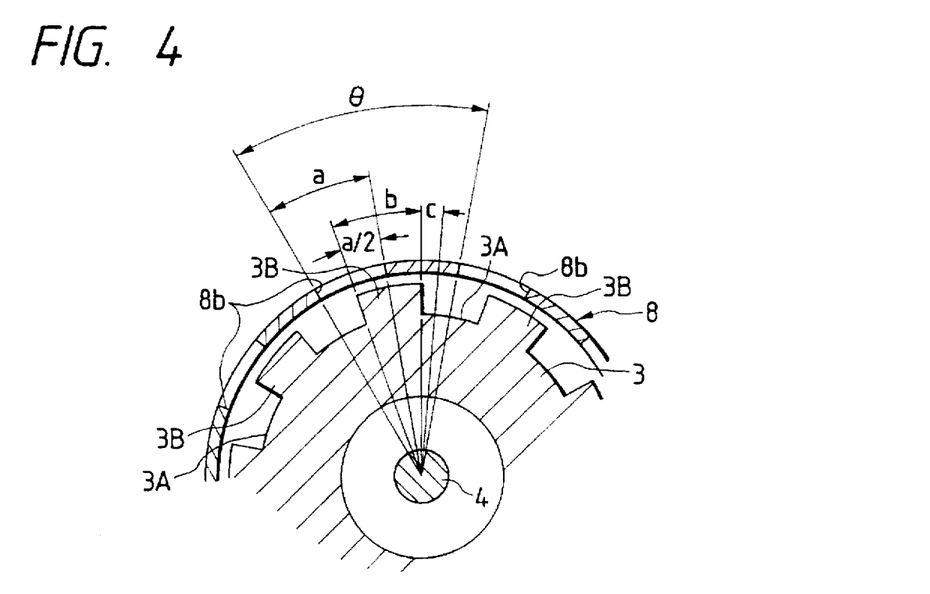
FIG. 4 is a cross-sectional view, taken along line 4—4 of FIG. 1, of the cylindrical member and the output shaft.

More specifically, as shown in FIG. 3, which is a cross-sectional view, taken along line 3—3 of FIG. 1, of the cylindrical member 8 and the output shaft 3, and also shown in FIG. 4, which is a cross-sectional view, taken along line 4—4 of FIG. 1, of the cylindrical member 8 and the output shaft 3, an angle obtained by dividing the peripheral surface of the cylindrical member 8 into N (in this example, N=9) equal parts is set as a one-period angle θ. In the case of the portion of the cylindrical member 8 which is close to the sleeve 2A, portions each spanning a degrees from one end of the one-period angle θ are set as the windows 8a, and each of the remaining portions of the (θ−a) degrees is closed. Meanwhile, in the case of the portion of the cylindrical member 8 which is away from the sleeve 2A, portions each spanning a degrees from the other end of the one-period angle θ are set as the windows 8b such that their phases with respect to the windows 8a are each offset by 180 degrees, and each of the remaining portions of the (θ−a) degrees is closed. Incidentally, the circumferential range of each projection 3B with a dove-tailed cross section, which is located between adjacent ones of the grooves 3A, is set as b degrees, and the range permitting relative rotation of the cylindrical member 8 and the output shaft 3 (the input shaft 2 and the output shaft 3) is set as c degrees.

An arrangement is provided such that when torsion has not occurred in the torsion bar 4 (when the steering torque is zero), as shown in FIG. 3, a circumferentially widthwise central portion of the window 8a and one circumferential end portion of the groove 3A (one edge portion of the projection 3B) overlap each other, and, as shown in FIG. 4, a circumferentially widthwise central portion of the window 8b and the other circumferential end portion of the groove 3A (the other edge portion of the projection 3B) overlap each other. Accordingly, the overlapping state of the window 8a and the groove 3A and the overlapping state of the window 8b and the groove 3A are opposite in the circumferential direction.

The relationship of the aforementioned angles can be set variously in accordance with the sensitivity to be obtained and the coil impedance, and is defined in this embodiment as follows:

$$a=(\theta-a)=b=(\theta-b)=\theta/2 \tag{1}$$

The cylindrical member 8 is surrounded by coils 10 and 11 having the same specifications. Specifically, the coil 10 is wound around a coil bobbin 10A, while the coil 11 is wound around a coil bobbin 11A. The coil bobbins 10A and 11A are accommodated in the inner sides of cylindrical coil yokes 9A and 9B, respectively. Namely, the coils 10 and 11 are disposed coaxially with the cylindrical member 8, and the coil 10 is wound around the coil bobbin 10A in such a mariner as to surround the portion where the windows 8a are formed, and the coil 10 is accommodated in the coil yoke 9A, while the coil 11 is wound around the coil bobbin 11A in such a manner as to surround the portion where the windows 8b are formed, and the coil 11 is accommodated in the coil yoke 9B.

Figure 5:
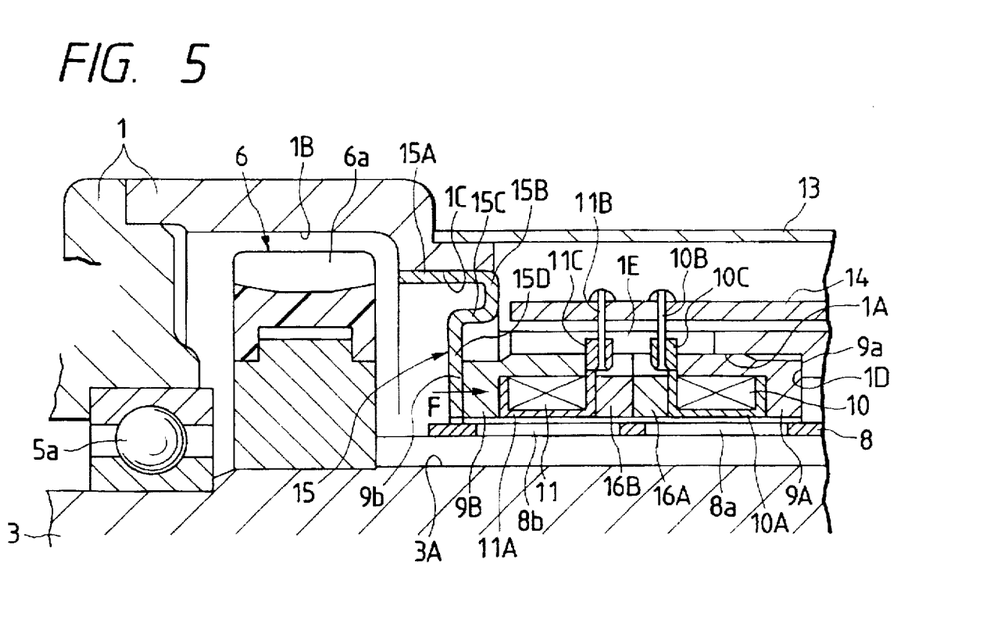
FIG. 5 is an enlarged view of essential portions shown in FIG. 1.

As shown in enlarged form in FIG. 5, the following portions are formed in the housing 1: a small-diameter portion 1A serving as a fitting portion for accommodating the coil yokes 9A and 9B disposed coaxially; a large-diameter portion 1B surrounding the worm wheel 6; and a medium-diameter portion 1C located between the small-diameter portion 1A and the large-diameter portion 1B. The coil yokes 9A and 9B are fitted to the small-diameter portion 1A from the left-hand side in FIG. 5, and a receiving surface 1D against which an end lace 9a of the coil yoke 9A as one end face thereof abuts is formed at a portion of the small-diameter portion 1A, which serves as a bottom when the coil yoke 9A is fitted. That is, the coil yokes 9A and 9B are positioned by being inserted into the small-diameter portion 1A up to the position where the end face 9a abuts against the receiving surface 1D.

In this embodiment, bobbin terminals 10B and 11B which are electrically connected to the respective coils 10 and 11 are provided in such a manner as to project radially outwardly from the outer peripheral surfaces of the coil yokes 9A and 9B. Namely, projecting portions 10C and 11C which project radially outwardly are formed on the coil bobbins 10A and 11A, and the coils 10 and 11 are wound around the respective coil bobbins 10A and 11A such that ends of the coils 10 and 11 extend to predetermined positions on the projecting portions 10C and 11C. Inner ends of the bobbin terminals 10B and 11b are electrically connected to the ends of the coils 10 and 11 located at the projecting portions 10C and 11C, and outer ends of the bobbin terminals 10B and 11b project radially outwardly from the projecting portions 10C and 11C. It should be noted, however, that the coil bobbins 10A and 11A are accommodated in the coil yokes 9A and 9B such that the bobbin terminals 10B and 11B are gathered at adjacent positions, and such that the projecting portions 10C and 11C of the coil bobbins 10A and 11A face each other so as to prevent the dislocation and the like of the coil bobbins due to their faulty fixing by bobbin fixing members 16A and 16B, which secure sealing surfaces and are separate pieces constituting parts of the coil yokes 9A and 9B.

A notched groove 1E for receiving the projecting portions 10C and 11C when the coil yokes 9A and 9B are fitted, is formed in the small-diameter portion 1A of the housing 1. That is, the notched groove 1E is a substantially U-shaped groove in a plan view, is open on the medium-diameter portion 1C side, extends in the axial direction, and is formed at an inner side of a control circuit board which will be described later. Incidentally, this notched groove 1E has the function of stopping the rotation of the coil yokes 9A and 9B.

Figure 6:
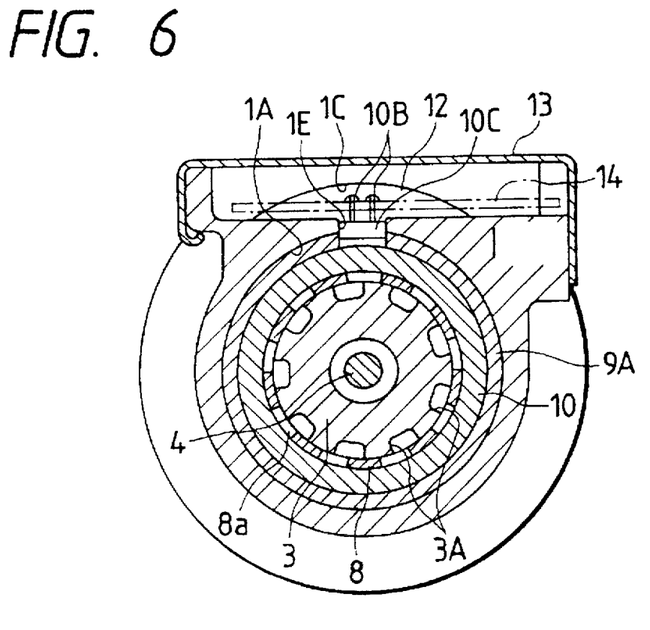
FIG. 6 is a cross-sectional view taken along line 6—6 of FIG. 1.
Figure 7:
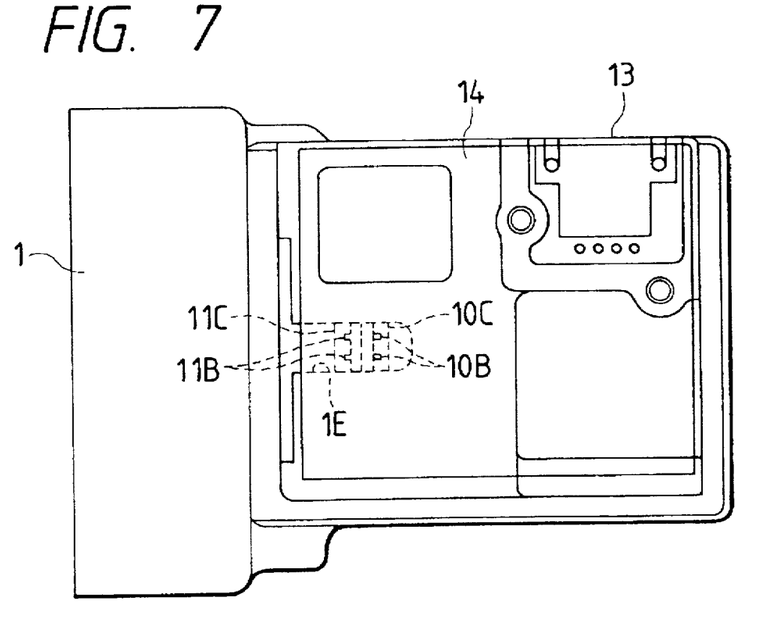
FIG. 7 is a fragmentary view taken in the direction of arrow 7 of FIG. 1.

As shown in FIG. 6, which is a cross-sectional view taken along line 6—6 of FIG. 1, and also shown in FIG. 7, which is a fragmentary view taken in the direction of arrow 7) of FIG. 1, the bobbin terminals 10B and 11B and a motor control circuit formed on the control circuit board 14 within a sensor case 13 are electrically connected to each other by soldering. Namely, the bobbin terminals 10B and 11B projecting from the outer surface of the small-diameter portion 1A are inserted from the reverse surface side of the control circuit board 14, and tips of the bobbin terminals 10B and 11B projecting from the upper surface side of the control circuit board 14 are connected to the motor control circuit by soldering.

Figure 8:
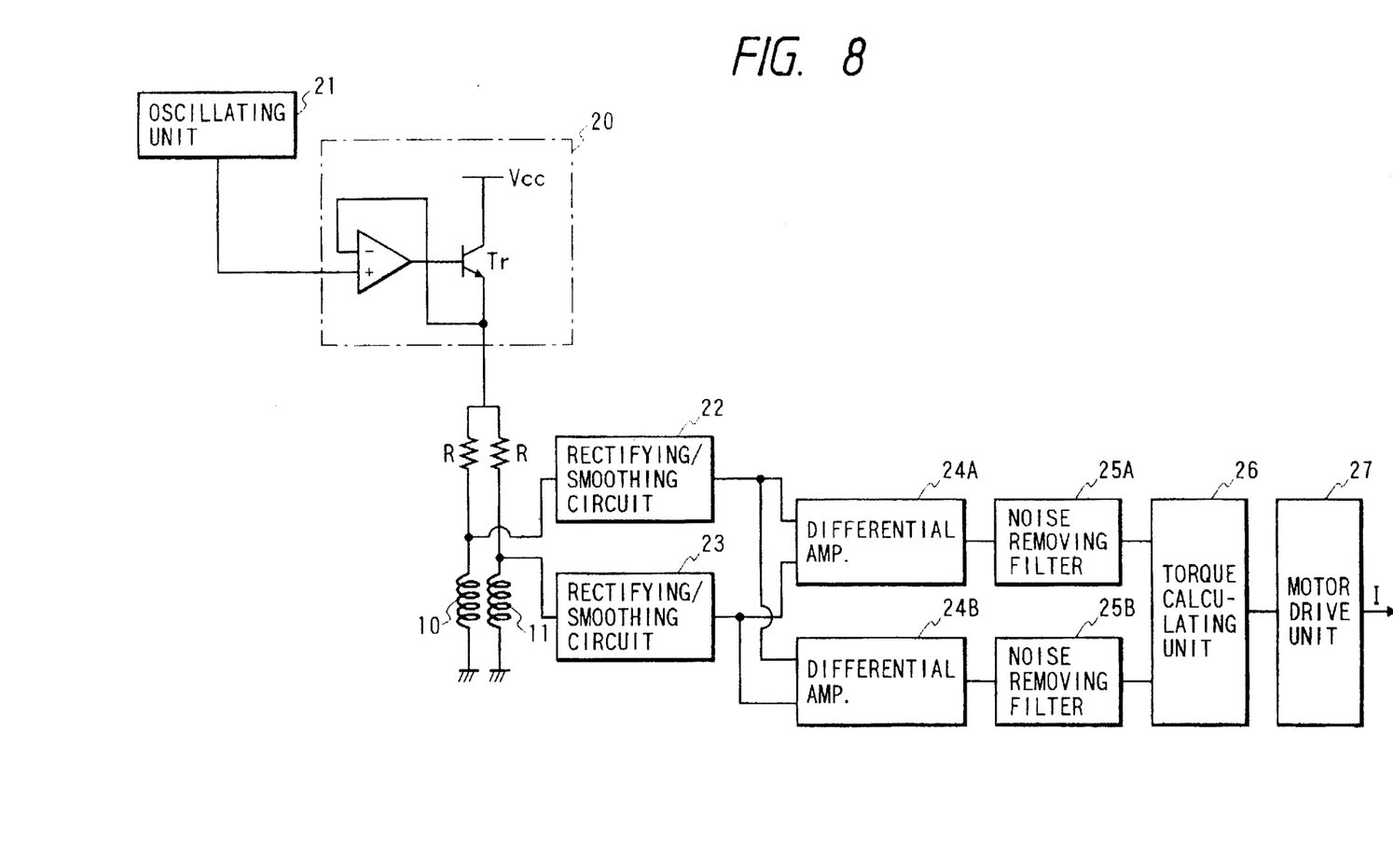
FIG. 8 is a circuit diagram illustrating an example of a motor control circuit.

As shown in FIG. 8, for example, the motor control circuit is comprised of the following: an oscillating unit 21 for supplying an ac current of a predetermined frequency to the coils 10 and 11 via a constant current unit 20; a rectifying/smoothing circuit 22 for rectifying and smoothing the self-induced electromotive force of the coil 10 and for outputting the same; a rectifying/smoothing circuit 23 for rectifying and smoothing the self-induced electromotive force of the coil 11 and for outputting the same; differential amplifiers 24A and 24B for amplifying the difference between the outputs of the rectifying/smoothing circuits 22 and 23 and for outputting the same; a noise removing filter 25A for removing a high-frequency noise component from the output of the differential amplifier 24A; a noise removing filter 25B for removing a high-frequency noise component from the output of the differential amplifier 24B; a torque calculating unit 26 for calculating the direction and magnitude of the relative rotational displacement of the input shaft 2 and the cylindrical member 8 on the basis of mean values, for example, of the outputs of the noise removing filters 25A and 25B, and for multiplying the results by, for example, a predetermined constant of proportion so as to determine the steering torque occurring in the steering system; and a motor driving unit 27 for supplying to the electric motor 7 a drive current I which will produce a steering assisting torque for alleviating the steering torque on the basis of the result of calculation by the torque calculating unit 26.

Further, as particularly shown in FIG. 5 in enlarged form, a metallic seal member 15 of a substantially cylindrical shape is press-fitted and secured to the inner side of the medium-diameter portion 1C of the housing 1.

Namely, this seal member 15 is comprised of a cylindrical portion 15A whose outer peripheral surface is brought into close contact with the inner peripheral surface of the medium-diameter portion 1C; an annular portion 15B extending radially inward from an end of the cylindrical portion 15B on the small-diameter portion 1A side; a small cylindrical portion 15C extending from an inner peripheral portion of the annular portion 15B toward the worm wheel 6 side; and a leaf spring portion 15D extending radially inward from an end of the small cylindrical portion 15C. In a state in which the seal member 15 is pressed-fitted arid secured in the medium-diameter portion 1C, the leaf spring portion 15D is brought into close contact with an end face 9b of the coil yoke 9B which is another end face thereof. The seat member 15 is arranged such that as the shapes of the annular portion 15B and the small cylindrical portion 15C under no load are adjusted appropriately, a spring force F which is directed in the left-and-right direction in FIG. 5 is produced in the leaf spring portion 15D held in close contact with the end face 9b of the coil yoke 9B. Consequently, the coil yokes 9A and 9B are urged toward the receiving surface 1D side.

It should be noted that, as shown in FIG. 1, an oil seal 16 is disposed between the inner peripheral surface of the housing 1 and the outer peripheral surface of the sleeve 2A, with the result that the space where the input shaft 2 is disposed and the space where the coil yokes 9A and 9B are disposed are isolated from each other.

Next, the operation of this embodiment will be described.

If it is now assumed that the steering system is in a state in which the vehicle is advancing straightly forward, and that the steering torque is therefore zero, relative rotation does not occur between the input shaft 2 and the output shaft 3. Hence, relative rotation does not occur between the output shaft 3 and the cylindrical member 8, either.

On the other hand, if a rotating force occurs in the input shaft 2 after the steering of the steering wheel, the rotating-force is transmitted to the output shaft 3 via the torsion bar 4. At this time, since a resisting force occurs in the output shaft 3 in correspondence with the frictional force acting between the wheels and the road surface and the frictional force of the meshing of gears in the rack-and-pinion type steering apparatus arranged on the unillustrated left end side of the output shaft 3, relative rotation occurs between the input shaft 2 and the output shaft 3 such that the output shaft 3 is delayed due to the twisting of the torsion bar 4. Hence, relative rotation occurs also between the output shaft 3 and the cylindrical member 8.

In a case where the cylindrical member 8 does not have windows formed therein, when an AC current is fed to the coils, to thereby cause an alternating field therein, an eddy current is generated in the outer surface of the cylindrical member 8, since the cylindrical member 8 is made of conductive and nonmagnetic material. The direction of the eddy current generated is opposite to that of the current fed to the coil.

When the magnetic fields developed by the eddy current are superposedly placed in the magnetic fields by the coils, these magnetic fields are cancelled by each other within the cylindrical member 8.

In a case where the cylindrical member 8 has windows 8a and 8b formed therein, the windows 8a and 8b prevent the eddy current, which is generated in the outer surface of the cylindrical member 8, from circulating through the circumferential outer surface. Therefore, the eddy current flows along one of the end faces of each window 8a and 8b to the inner side of cylindrical member 8. In the inner side of the cylindrical member 8, the eddy current flows in the same direction as the coil current. The eddy current emanates from the inner side of the cylindrical member 8, passes through the other end face of the window, and returns to the outer side or surface thereof. Thus, the eddy current path is looped.

In other words, a plural number of eddy current loops are circumferentially arranged periodically (in this embodiment, θ=360/N, N=9) within each coil.

The magnetic fields developed by the coil currents are superposedly placed in the eddy current. The resultant magnetic field is distributed such that the intensity thereof periodically varies in the circumferential direction, viz., along, and above and below the shell of the cylindrical member 8 when viewed in cross section, and gradually decreases toward the center of the cylindrical member 8. The magnetic field, which is circumferentially distributed, is most intensive at the center of each of the windows 8a and 8b where the magnetic field is largely influenced by the adjacent eddy currents, and is weak at a position shifted from center of the window by the half period (θ/2).

Within the cylindrical member 8, the shalt 3 made of magnetic material is disposed coaxially with the cylindrical member 8. The grooves 3A and the raised parts 3B, arrayed at the same periods as the windows 8a and 8b, are formed in the outer surface of the output shaft 3.

When a magnetic material is placed in a magnetic field, it is magnetized and the magnetized magnetic material spontaneously develops a magnetic flux. The quantity of the magnetic flux increases proportionally to an intensity of the magnetic field till the magnetic material is magnetically saturated.

The spontaneous magnetization of the output shaft 3 varies with a relative phase of the output shaft 3 to the cylindrical member 8 under the influence by the magnetic field periodically varying in the circumferential direction and the magnetic field varying in the radial direction.

A phase of the output shaft to maximize the spontaneous magnetization is set at a point where the center of each of the windows 8a and 8b is coincident with the center of each of the raised parts 3B.

The coil inductance varies with a variation of the spontaneous magnetization. A profile of the variation of the coil inductance is substantially sinusoidal.

A phase of the output shaft when no torque acts on the shaft per se is shifted ¼ period (θ/4) from the phase to maximize the spontaneous magnetization (inductance). The phase difference between the window series located closer to the sleeve 2A and the window series farther from the sleeve 2A is ½ period (θ/2), as already mentioned.

With the mechanical and electrical construction, when a torque acts on the shaft and a phase difference is created between the output shaft 3 and the cylindrical member 8, one of the coils 10 and 11 increases in its inductance, while the other decreases at the same varying rate.

Figure 9:
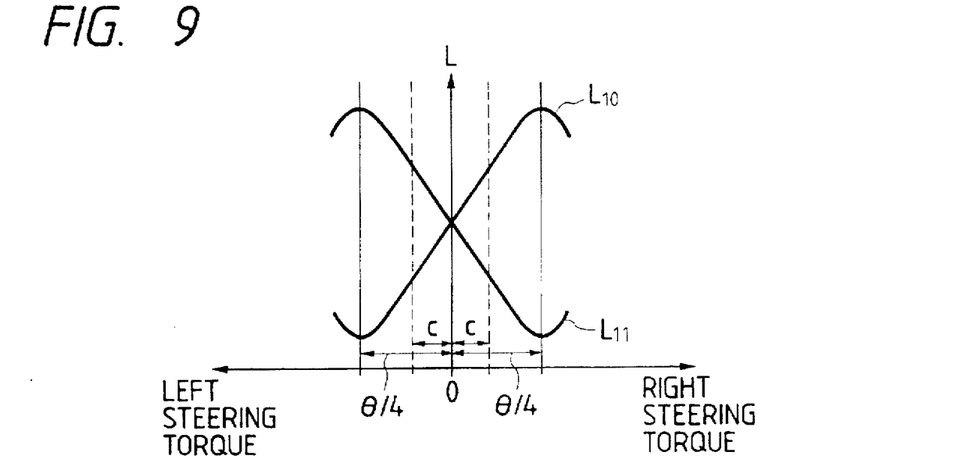
FIG. 9 is a graph illustrating the relationship between the steering torque and inductances of coils.

When a clockwise steering torque is generated, the cylindrical member 8 is turned counterclockwise in FIGS. 3 and 4. At this time, the inductance $L_{10}$ of the coil 10 increases from the inductance value when the steering torque is zero, while the inductance $L_{11}$ of the coil 11 decreases, as shown in FIG. 9. With increase of a counterclockwise steering torque, the inductance $L_{10}$ of the coil 10 decreases, while the inductance $L_{11}$ of the coil 11 increases. The relationship between a relative rotation angle of the cylindrical member 8 to the output shaft 3 and the steering torque is also shown in FIG. 9. As seen from the graph of the figure, in a range where a relative angle is varied by an angle (θ/4) from the position where the steering torque is 0 in the direction of increasing the clockwise steering torque or the counterclockwise steering torque, the inductance values $L_{10}$ and $L_{11}$ monotonously vary. When the steering torque increases in excess of the range, the inductance values $L_{10}$ and $L_{11}$ vary in the reverse direction. It is for this reason that the range of the relative turn is limited within $\pm c°$.

When the inductances $L_{10}$ and $L_{11}$ change as shown in FIG. 9, under the condition where the frequency ω of the current supplied from the oscillating unit 21 is constant, the impedances of the coils 10 and 11 also change with tendencies similar to those of the inductances $L_{10}$ and $L_{11}$ shown in FIG. 9, while the self-induced electromotive forces of the coils 10 and 11 also change with similar tendencies. Accordingly, the outputs of the differential amplifiers 24A and 24B for determining the self-induced electromotive forces of the coils 10 and 11 change linearly in correspondence with the direction and magnitude of the steering torque. In addition, the difference between the outputs of the rectifying/smoothing circuits 22 and 23 is determined by the differential amplifiers 24A and 24B, the change in the self-inductance due to the temperature and the like is canceled.

Then, the torque calculating unit 26 calculates mean values of outputs of the differential amplifiers 24A and 24B which are supplied via the noise removing filters 25A and 25B, determines the steering torque by multiplying the values by, for example, a predetermined constant of proportion, and supplies the result to the motor driving unit 27. The motor driving unit 27 supplies to the electric motor 7 the drive current I corresponding to the direction and magnitude of the steering torque.

Then, the electric motor 7 produces a rotating force which corresponds to the direction and magnitude of the steering torque occurring in the steering system, and the rotating force is transmitted to the output shaft 3 by means of the worm gear and the like. Hence, a steering assisting torque is imparted to the output shaft 3, with the result that the steering torque is reduced, thereby alleviating the burden imposed on a driver.

Here, in this embodiment, in order to permit completely automatic winding of the coils 10 and 11 and to ensure that the troublesome connection between the coils 10 and 11 and the control circuit board 14 by means of the harness is made unnecessary, the bobbin projections 10B and 10B are formed on the coil bobbins 10A and 11A. Accordingly, the notched groove 1E in the small-diameter portion 1A is made essential. However, as a result of the provision of the notched groove 1E, there is a problem in that even if the coil yokes 9A and 9B are press-fitted to the small-diameter portion 1A, the space where the worm wheel 6 is disposed and the inner side of the sensor case 13 cannot be isolated from each other.

However, in this embodiment, the space where the worm wheel 6 is disposed and the interior of the sensor case 13 in which the control circuit board 14 is disposed are isolated from each other, since the outer peripheral surface of the cylindrical portion 15A of the seal member 15 is brought into close contact with the inner peripheral surface of the medium-diameter portion 1C, and the leaf spring portion 15D of the seal member 15 is brought into close contact with the end face 9b of the coil yoke 9B with the spring force F.

Hence, lubricating oil supplied to the meshing portions of the worm wheel 6 and the worm 7b is prevented from entering the interior of the sensor case 13, and, conversely, parts which came off the control circuit board 14, dust, and the like are prevented from entering the meshing portions of the worm wheel 6 and the worm 7b.

Further, since the coil yokes 9A and 9B are urged toward the receiving surface 1D side by means of the leaf spring portion 15D of the seal member 15, it is possible to prevent the movement of the coil yokes 9A and 9B in the direction in which the coil yokes 9A and 9B come off the small-diameter portion 1A. This being the case, since it is not unnecessary to press-fit the coil yokes 9A and 9B firmly into the small-diameter portion 1A, stress due to the press-fitting is not applied to the coil yokes 9A and 9B, and a defect such as a change in their magnetic property due to the opposite effect of magnetostriction does not occur.

Thus, since the seal member 15 which has both the sealing function and the coil-yoke fixing fuction is used, it is possible to obtain desired functions without causing an increase in the number of component parts or the number of assembling steps. Hence, the fixing structure in accordance with the present invention is advantageous in terms of cost, and is also advantageous in making the apparatus compact.

Figure 10:
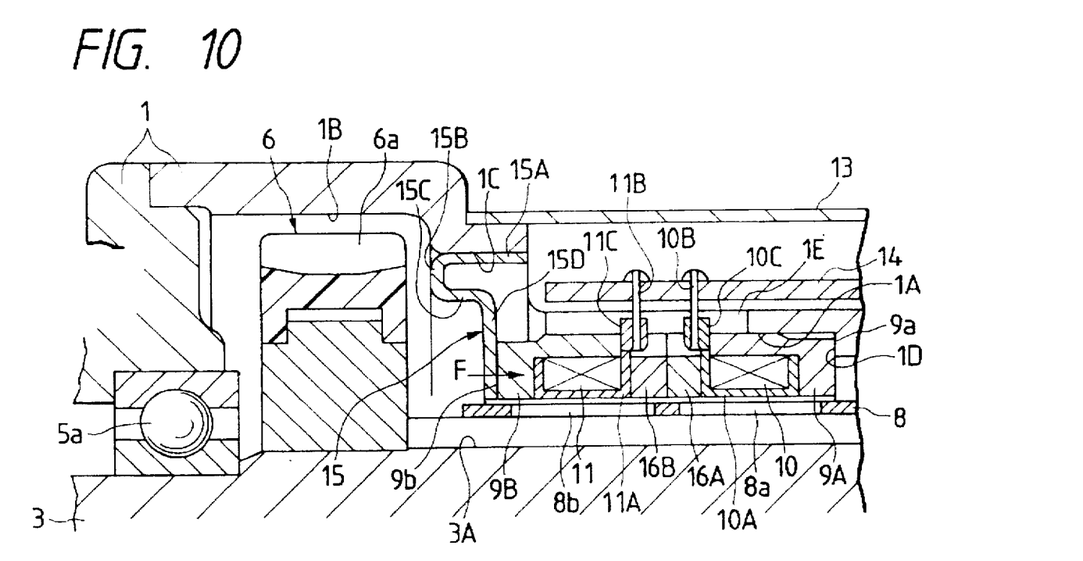
FIG. 10 is an enlarged cross-sectional view of essential portions illustrating a second embodiment of the present invention.

FIG. 10 is a diagram illustrating a second embodiment of the present invention. This embodiment also shows an example in which the present invention is applied to the structure for fixing a coil yoke in a torque sensor for an electrically-operated power steering apparatus for a vehicle. Incidentally, those members and portions which are similar to those of the above-described first embodiment will be denoted by the same reference numerals, and an overlapping description thereof will be omitted.

Namely, in this embodiment, as shown in FIG. 10, which is an enlarged cross-sectional view of essential portions and is similar to FIG. 5 illustrating the above-described first embodiment, the orientation of the seal member 15 is made different from that of the above-described first embodiment. In other words, the seal member 15 is press-fitted and secured to the medium-diameter portion 1C of the housing 1 such that the annular portion 15B is located on the worm wheel 6 side. In addition, an arrangement is provided such that as the shapes of the annular portion 15B and the small cylindrical portion 15C under no load are adjusted appropriately, the spring force F is produced in the leaf spring portion 15D in such a manner as to urge the coil yokes 9A and 9B toward the receiving surface 1D side. The other arrangements are similar to those of the above-described first embodiment.

With such a configuration, it is possible to obtain operation and effect similar to those of the above-described first embodiment. In addition, since the annular portion 15B is located on the worm wheel 6 side, when the seal member 15 is press-fitted and secured, the annular portion 15B can be pressed by a jig. Hence, there is an advantage in that assembly is facilitated.

Figure 11:
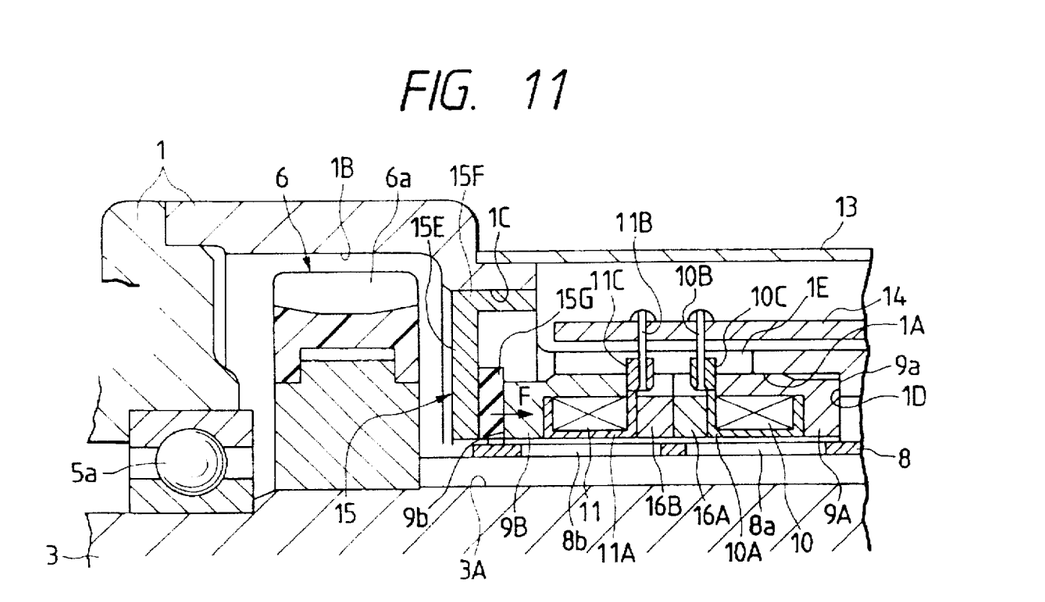
FIG. 11 is an enlarged cross-sectional view of essential portions illustrating a third embodiment of the present invention

FIG. 11 is a diagram illustrating a third embodiment of the present invention. This embodiment also shows an example in which the present invention is applied to the structure for fixing a coil yoke in a torque sensor for an electrically-operated power steering apparatus for a vehicle. Incidentally, those members and portions which are similar to those of the above-described first embodiment will be denoted by the same reference numerals, and an overlapping description thereof will be omitted.

Namely, in this embodiment, as shown in FIG. 11, which is an enlarged cross-sectional view of essential portions and is similar to FIG. 5 illustrating the above-described first embodiment, the seal member 15 is comprised of a metallic annular portion 15E and a cylindrical portion 15F which extends from an outer periphery of the annular portion 15E. The cylindrical portion 15F is press-fitted and secured to the medium-diamter portion 1C of the housing 1 such that the annular portion 15E is located on the worm wheel 6 side. In addition, an annular rubber elastic member 15G is secured to the surface of the annular portion 15E which faces the coil yoke 9B, in such a manner as to be brought into clause contact with the end face 9b of the coil yoke 9B. As the cylindrical portion 15F is press-fitted and Secured to the medium-diameter portion 1C, the rubber elastic member 15G is made to undergo elastic deformation in a compressing direction between the annular portion 15E and the end face 9b. That is, in this embodiment, the spring force F for urging the coil yokes 9A and 9B toward the receiving surface 1D side is produced by making use of the restoring force of the rubber elastic member 15G which is compressed between the annular portion 15E and the end face 9b. The other arrangements are similar to those of the above-described first embodiment.

With such a configuration as well, it is possible to obtain operation and effect similar to those of the above-described first embodiment. In addition, there is an advantage in that, as a result of using the rubber elastic member 15G, the sealing characteristic between the rubber elastic member 15G and the end face 9b can be improved.

It should be noted that, although in the above-described embodiments the bobbin terminals 10B and 11B are provided on the coil bobbins 10A and 11A around which the coils 10 and 11 are wound, the present invention is also applicable to an apparatus of a type in which such bobbin terminals 10B and 11B are not provided.

In addition, although in the above-described embodiments a description has been given of the case in which the present invention is applied to the structure for fixing a coil yoke in a torque sensor for an electrically-operated power steering apparatus for a vehicle, the present invention is not limited to the same as an object to which it is applied. For instance, the present invention may be applied to a torque sensor for other than the electrically-operated power steering apparatus, or may be applied to an apparatus other than the torque sensor.

As described above, in accordance with the present invention, there is provided a structure for fixing a coil yoke to a fitting portion of a housing, wherein a receiving surface against which one end face of the coil yoke abuts is formed at a portion of the fitting portion which serves as a bottom when the coil yoke is fitted, and a seal member is provided which is brought into close contact with another end face of the coil yoke fitted in the fitting portion, and urges the other end face toward the receiving surface, an overall outer peripheral surface of the seal member being brought into close contact with an inner peripheral surface of the housing. Accordingly, it is possible to obtain an advantage in that the structure for fixing a coil yoke is simple in structure, makes it unnecessary to press-fit the coil yoke to the housing, and makes it possible to prevent a change in the magnetic property and obtain a sealing effect.

What is claimed is:

1. A torque sensor, comprising:
   a coil bobbin around which a coil is wound;
   a coil yoke having a first end face and a second end face, said coil yoke accommodating said coil bobbin;
   a housing having a medium-diameter portion and a small-diameter portion, said housing being shaped to receive said coil yoke and having a receiving surface at one end of the small-diameter portion, said first end face of said coil yoke abutting against said receiving surface; and a seal member that contacts said second end face of said coil yoke and urges said coil yoke toward said receiving surface to fix a position of said coil yoke in said housing, an outer peripheral surface of said seal member being secured to an inner peripheral surface of said housing at said medium-diameter portion of said housing.

2. A torque sensor as claimed in claim 1, wherein said seal member comprises:

a cylindrical portion having said outer peripheral surface that is secured to said inner peripheral surface of said housing;

an annular portion extending radially inward from an end of said cylindrical portion;

another cylindrical portion extending from said annular portion; and a leaf spring portion extending radially inward from said another cylindrical portion, said leaf spring portion contacting said second end face of said coil yoke and urging said coil yoke toward said receiving surface.

3. A torque sensor as claimed in claim 1, wherein said seal member comprises;

a metallic annular portion;

a cylindrical portion extending from an outer periphery of said metallic annular portion, said cylindrical portion having said outer peripheral surface that is secured to said inner peripheral surface of said housing; and an annular rubber elastic member secured to said metallic annular portion, said annular rubber elastic member contacting said second end face of said coil yoke and urging said coil yoke toward said receiving surface.

* * * * *